(No Model.) 4 Sheets—Sheet 1.
W. WILSON.
VALVE GEAR.
No. 357,256. Patented Feb. 8, 1887.
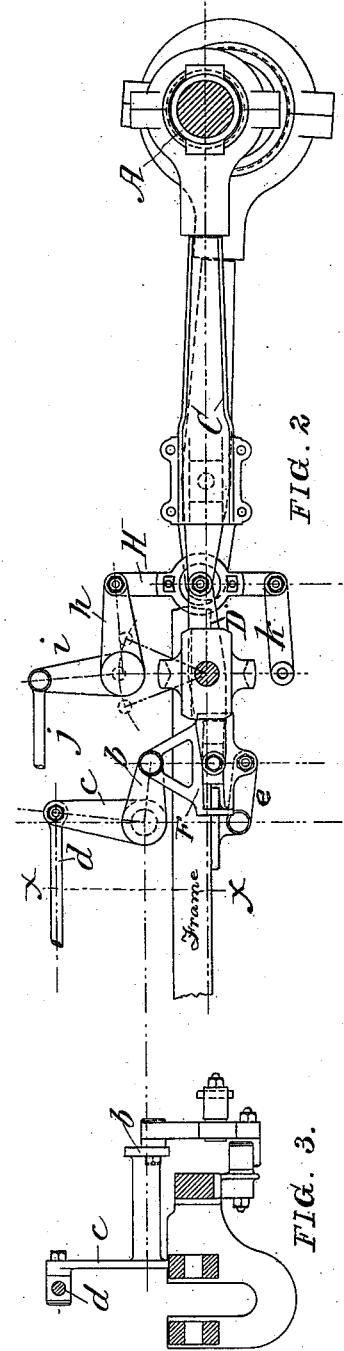
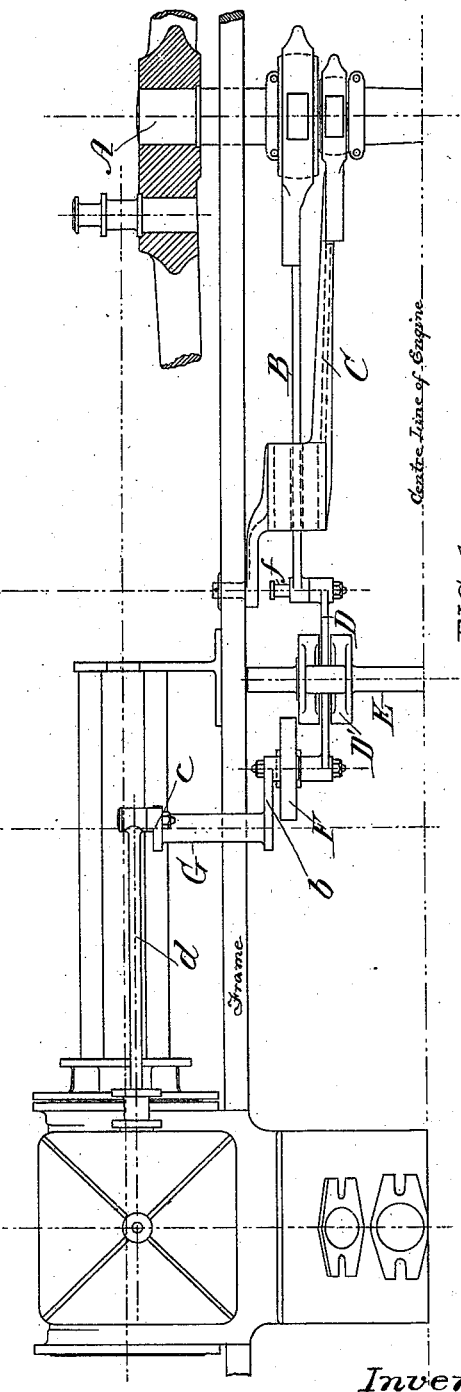
Witnesses.
E. A. West
Harry T. Jones
Inventor.
William Wilson (No Model.) 4 Sheets—Sheet 2.

W. WILSON.
VALVE GEAR.

No. 357,256. Patented Feb. 8, 1887.

Witnesses
E. A. West.
Harry T. Jones.

Inventor.
William Wilson (No Model.) 4 Sheets—Sheet 3.
W. WILSON.
VALVE GEAR.
No. 357,256. Patented Feb. 8, 1887.
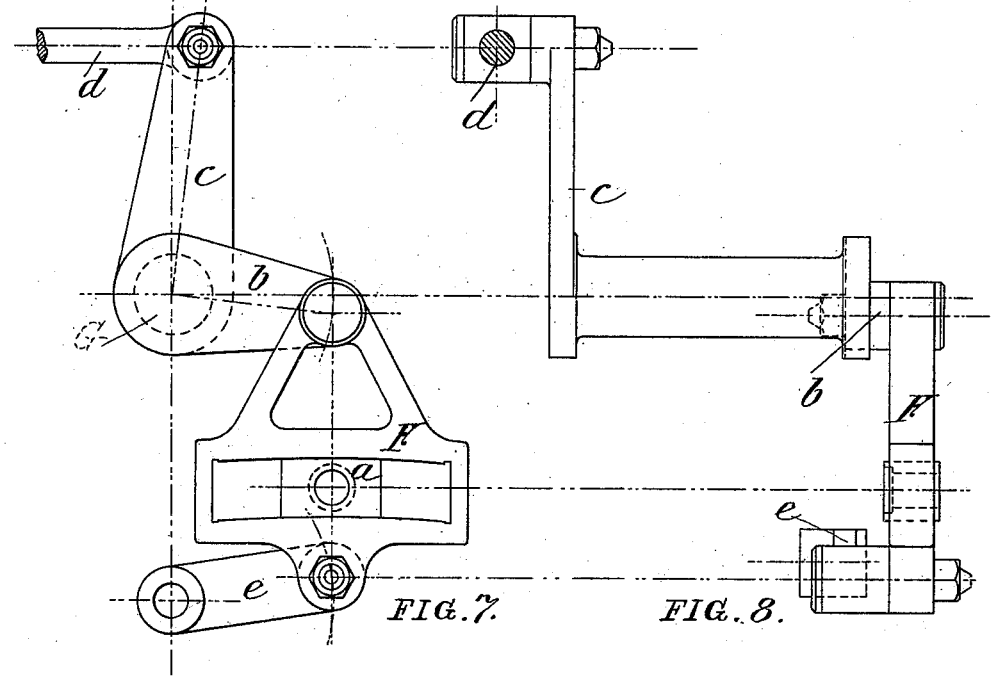
FIG. 7. FIG. 8.
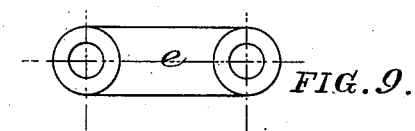
FIG. 9.
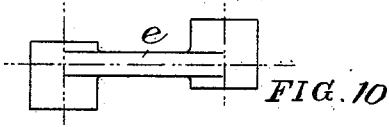
FIG. 10.
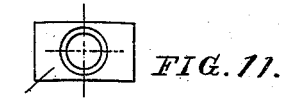
FIG. 11.
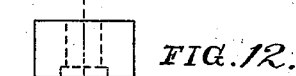
FIG. 12.
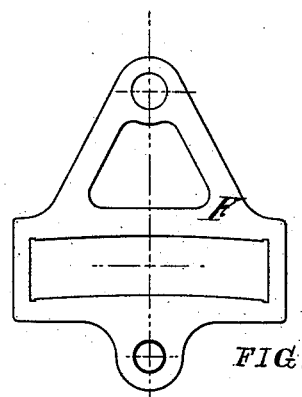
FIG. 13.
FIG. 14.
Witnesses
E. A. West
Harry T. Jones
Inventor
William Wilson

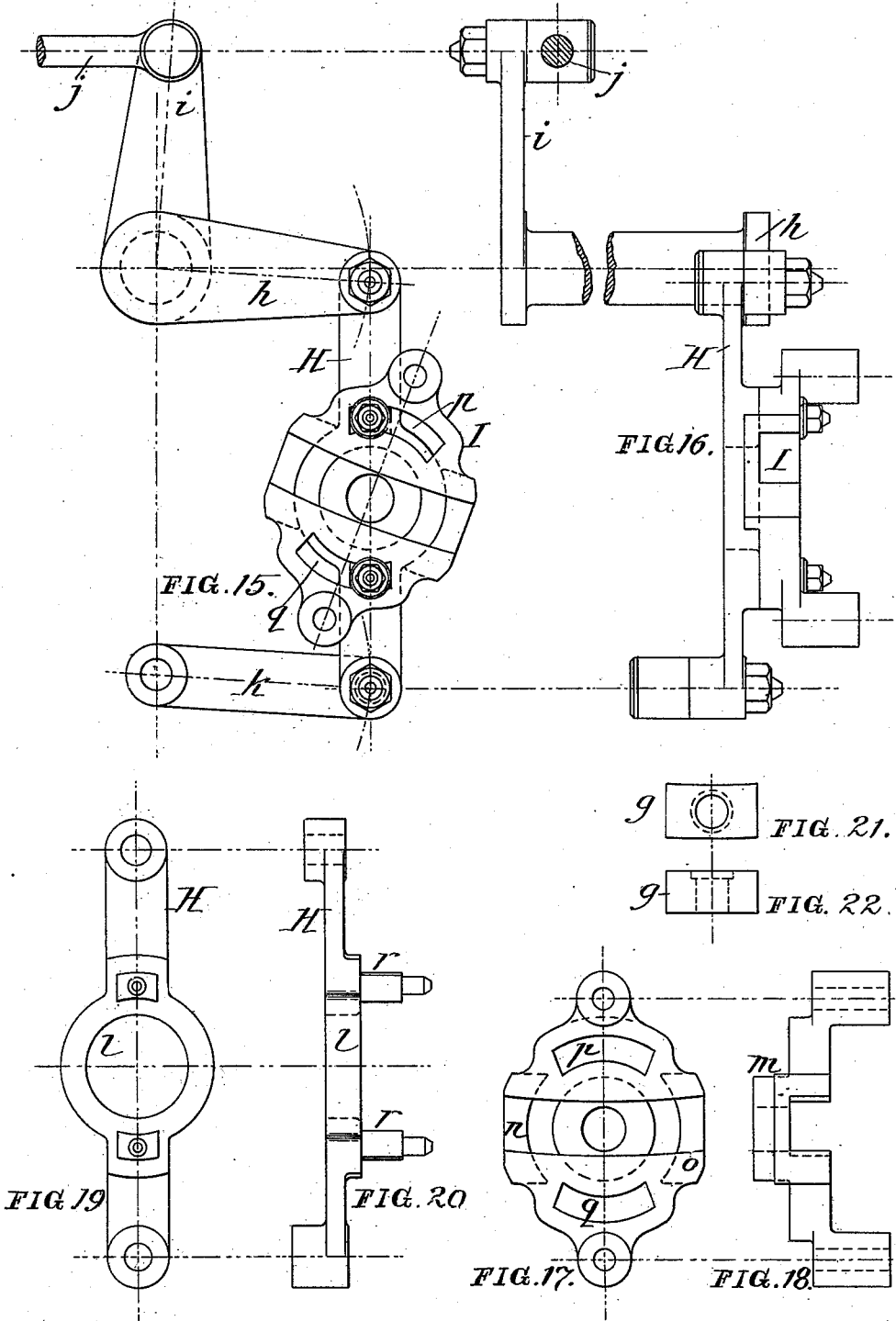

UNITED STATES PATENT OFFICE.

WILLIAM WILSON, OF BLOOMINGTON, ILLINOIS.

VALVE-GEAR.

SPECIFICATION forming part of Letters Patent No. 357,256, dated February 8, 1887.

Application filed November 11, 1886. Serial No. 218,605. (No model.)

*To all whom it may concern:*

Be it known that I, WILLIAM WILSON, residing at Bloomington, in the county of McLean and State of Illinois, and a citizen of the United States, have invented a new and useful Improvement in Valve-Gear, of which the following is a full description, reference being had to the accompanying drawings, in which—

Figure 6:
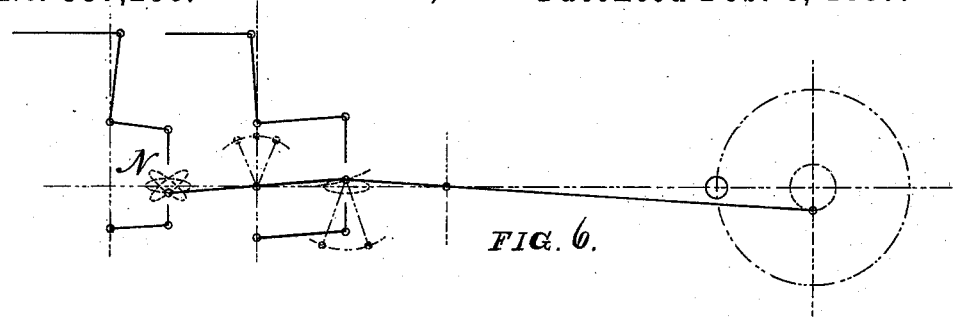
Figure 4:
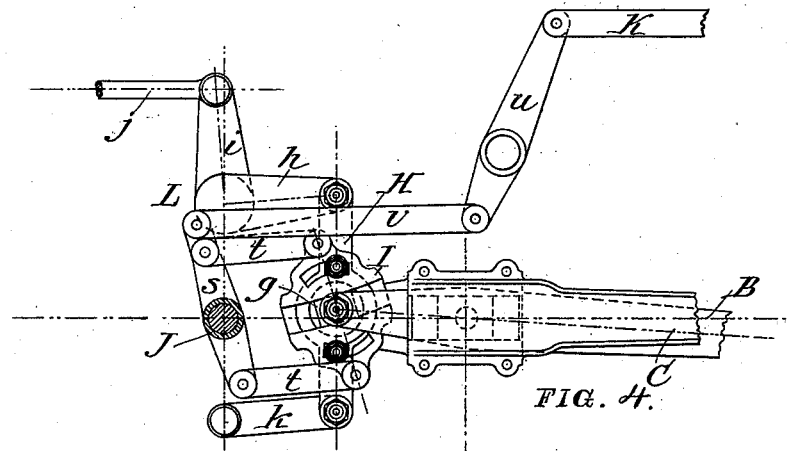
Figure 5:
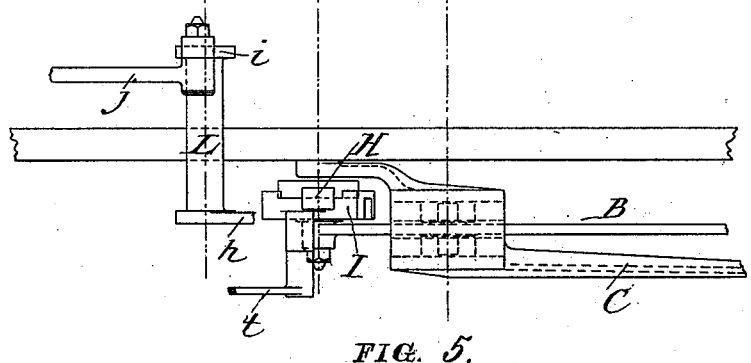

Figure 1 is a plan, the devices for moving the exhaust-valve being omitted. Fig. 2 is a side elevation, the devices for reversing the exhaust-valve and the slotted yoke used in connection therewith being omitted. Fig. 3 is a section at line $x$ of Fig. 2, showing the devices for operating the main valve only. Fig. 4 is a detail, being a side view of the yoke and other devices for moving the exhaust-valve, with some other parts also in view. Fig. 5 is a detail, being a plan showing the slotted yoke for moving the exhaust-valve, the reversing devices shown in Fig. 4 being omitted. Fig. 6 is a diagram illustrating the motions of the main and exhaust valves. Fig. 7 is a detail, being a side elevation of the slotted yoke, guiding-arm, and rocker-arm for transmitting motion to the main valve and for correcting the same. Fig. 8 is a front elevation of the parts shown in Fig. 7. Fig. 9 is a front elevation of the guiding-arm. Fig. 10 is a top view of the guiding-arm. Fig. 11 is a side view of the block shown in Fig. 7. Fig. 12 is a top view of such block. Fig. 13 is a detail, being a side view of the slotted yoke shown in Fig. 7. Fig. 14 is a top view of the same. Fig. 15 is a detail, being a side view of the slotted yoke, vertical arm, guiding-arm, and rocker for transmitting motion to the exhaust-valve. Fig. 16 is a front elevation of the parts shown in Fig. 15. Fig. 17 is a detail, being a side elevation of the yoke shown in Fig. 15. Fig. 18 is a side elevation of the yoke shown in Fig. 17. Fig. 19 is a detail showing in elevation the vertical arm shown in Fig. 15, with which the slotted yoke therein is connected. Fig. 20 is a side view of the bar shown in Fig. 19. Fig. 21 is a side view of the block used in the slotted yoke shown in Fig. 15. Fig. 22 is a plan of said block shown in Fig. 21. Figs. 7 to 22, inclusive, are enlarged.

Letters Patent of the United States, No. 333,706, dated January 5, 1886, for improvement in valve-gear, have been granted to me. The leading object of the invention secured by that patent was to provide for operating an admission and exhaust valve by means of a single eccentric-lever, and at the same time provide for correction of the movements of the valves and to maintain a constant lead and release.

The object of this invention is to provide more simple and effectual devices for operating the two valves and securing a correct movement thereof, which I accomplish as illustrated in the drawings and as hereinafter described.

Those things which I claim as new will be pointed out in claims.

The principal parts of the mechanism shown and described herein are substantially the same as those shown and described in my said former patent.

I will describe my improvement adapted for use with a locomotive.

In the drawings, A represents the axle.

B is an eccentric-lever, connected at one end with the axle and operated thereby, as usual.

C is a radius-bar, one end of which is arranged on the axle and concentric therewith, and its forward end is supported by the frame. As shown, the radius-bar is made in two parts joined together by bolts, the joined parts being enlarged and provided with an opening, through which the eccentric-lever passes.

D is a lever through which the admission-valve is operated. One end of this lever is pivoted to the forward end of the eccentric-lever, and it passes through a guide, D', which is secured to a reversing-shaft, E. This lever is pivoted in blocks in the guide by means of trunnions. The forward end of this lever D is pivoted to a block, $a$, which moves in a slotted yoke, F. The upper end of this slotted yoke is pivoted to an arm, $b$, secured to a rock-shaft, G.

$c$ is an arm upon the shaft G, the upper end of which is pivoted to the valve-rod $d$, which is connected with the admission-valve. The lower end of the yoke F is pivoted to one end of a guiding-arm, $e$. The opposite end of this arm $e$ is pivoted to a fixed point, and this pivotal point is so arranged that the arm $e$ is not parallel with the arm $b$ upon the shaft G. This is an important feature and produces an important result—correcting the irregularity of the connecting-rod and eccentric-lever due to their angularity, and securing a correct movement of the main valve at all points of cut-off. If the guiding-arm e were parallel to the arm b, the movement of the upper and lower pivotal points of the slotted yoke F would be alike, and the irregularities mentioned would necessarily be imparted to the valve; but by arranging this guiding-arm e so that it is not parallel with the arm b the lower center or pivotal point of the yoke will be thrown each way out of its perpendicular position in relation to the top center or pivotal point, thereby substantially correcting all such irregularities. The action is illustrated at N, Fig. 6, and by dotted lines in Fig. 7.

f, Fig. 1, is an extension of the pin upon which the forward end of the eccentric-lever B is pivoted. g is a block which is pivotally located upon this projecting pin f. This block is not shown in Fig. 1. Its position can be seen in Fig. 4.

H is a vertical bar, the upper end of which is pivoted to an arm, h, upon a rock-shaft.

i is another arm upon such rock-shaft, the upper end of which is pivoted to the valve-rod j, which operates the exhaust-valve. The lower end of the bar H is pivoted to one end of a guiding-arm, k, and the other end of this arm k is pivoted to a fixed point. The center of the bar H is enlarged and provided with a large central opening, l. (See Fig. 19.)

I is a slotted yoke provided at its center with a hub, m, which fits into the hole l in the bar H. This slotted yoke is so constructed that the parts n o fit over the periphery of the enlargement at the center of the bar H, serving as guides. In this slotted yoke are two slots, p q, through which pass pins r, which are secured to the bar H, which serve as guides for the slotted yoke, suitable washers and nuts being provided on the ends of the pins r. The block g moves in the long slot in the face of the slotted yoke I when the eccentric-lever is in motion.

J, Fig. 4, is a reversing-shaft. s is a lever on such shaft.

t t are two bars, one connecting the upper part of the lever s with the upper end of the slotted yoke I, and the other connecting the lower end of the lever s with the lower end of such slotted yoke.

K is a reversing-rod leading back to the cab.

u is a lever.

v is a connecting rod or arm.

The reversing-shaft J is operated through the rod K, lever u, arm v, and lever s, and at the same time the slotted yoke I is reversed through the action of the arms t t. The forward end of the eccentric-lever moves in a constant oval path. The block g is pivoted to and driven by the eccentric-lever and moves in the slotted yoke I when the eccentric-lever is in motion. This slotted yoke can be held in proper position by the reversing-lever connections, and can be partly rotated on its center by such lever-connections, bringing the slotted yoke to the proper angle for either forward or backward motion, and when held in either position the sliding block g, which moves in an oval path, will cause the vertical arm H to move up and down, and its motion will be imparted to the exhaust-valve through the rock-shaft L and valve-rod j, and will give a correct exhaust opening and closure. The angle of the slotted yoke can be varied so as to produce any desired exhaust opening and closure from fifty to one hundred per cent. of the stroke.

In some cases the eccentric-lever may be pivoted directly to the block a, as fully shown and described in a former application.

What I claim as new, and desire to secure by Letters Patent, is—

1. A slotted yoke, F, pivoted at one end to an arm on a shaft through which the main valve is operated, and pivoted at its other end to one end of a guiding-arm, which arm is pivoted at its opposite end to a fixed support, such guiding-arm being so arranged that it is not parallel with the arm to which the upper end of the yoke is pivoted, a block, a, and a lever pivoted thereto, from which lever the block derives its motion, substantially as and for the purposes specified.

2. The combination of an eccentric-lever, a block, g, pivoted to such lever, a bar, H, a slotted yoke, I, centrally pivoted to the bar H, and pivoted at its upper end to an arm on the shaft through which the exhaust-valve is operated, and pivoted at its lower end to a guiding-arm, and a reversing-shaft and connections between such reversing-shaft and the slotted yoke, substantially as and for the purpose specified.

WILLIAM WILSON.

Witnesses:
E. A. WEST,
HARRY T. JONES.